United States Patent [19]

Archer et al.

[11] 3,824,565

[45] July 16, 1974

[54] MULTIPLE BAR BUBBLE DOMAIN GENERATOR

[75] Inventors: John L. Archer, Orange; Leonard R. Tocci, Laguna Niguel; Thomas T. Chen, Orange, all of Calif.

[73] Assignee: North America Rockwell Corporation, El Segunda, Calif.

[22] Filed: Sept. 27, 1972

[21] Appl. No.: 292,712

[52] U.S. Cl. .................... 340/174 TF, 340/174 SR
[51] Int. Cl. .................... G11c 11/14
[58] Field of Search .................... 340/174 TF

[56] References Cited

UNITED STATES PATENTS

| | | | |
|---|---|---|---|
| 3,523,286 | 8/1970 | Bobeck et al. | 340/174 TF |
| 3,611,331 | 10/1971 | Bonyhard | 340/174 TF |
| 3,735,370 | 5/1973 | Michaelis | 340/174 TF |
| 3,760,385 | 9/1973 | Bierlein | 340/174 TF |

*Primary Examiner*—James W. Moffitt
*Attorney, Agent, or Firm*—H. Frederick Hamann; G. Donald Weber, Jr.

[57] ABSTRACT

An improved generator device for use in producing magnetic bubble domains in a magnetic bubble domain apparatus.

10 Claims, 4 Drawing Figures

MULTIPLE BAR BUBBLE DOMAIN GENERATOR

BACKGROUND OF THE INVENTION

The so-called bubble domain or single-wall isolated domain technology, while relatively new, has been experiencing extremely rapid and continuous growth. This technology which utilizes isolated areas of a particular magnetic polarization in an overall magnetic film of a different polarization is being investigated extensively for utilization in many electro-magnetic applications.

In this type of technology, the isolated domains or bubble domains are generated in the magnetic film, propagated therethrough and operated upon by a suitable utilization device. Much investigation has gone into the fabrication of propagation paths in magnetic bubble devices and the establishment of preferred configurations and dimensions in the propagation path elements. In addition, many types of detector arrangements have been proposed. Typically, a useful and desirable detector is described in the copending application of J. L. Archer, L. R. Tocci and J. L. Williams entitled MAGNETIC BUBBLE DOMAIN DETECTION DEVICE, bearing Ser. No. 290,607, filed on Sept. 20, 1972, and assigned to the common Assignee.

In the area of bubble domain generators, the common bubble domain generators known in the art are referred to as a keyhole generator or a loop generator. However, these domain generators suffer from problems in criticality of alignment, "cutoff" signal application, and "margin" characteristics. In order to establish a fully workable magnetic device with desirable operating characteristics, improved bubble domain generator stations and devices are desirable. Consequently, the subject invention has been provided.

SUMMARY OF THE INVENTION

A multiple bar keyhole bubble domain generator is provided. A pad of magnetizable material for generating a "seed" magnetic bubble is disposed adjacent to a pair of bar-like magnetizable areas. These magnetizable areas are non-parallel. A propagation path is adjacent to the multiple bars such that the multiple bars are between the pad and the path. A bubble severing conductor is arranged to pass between the pad and path and to overlie at least one of the multiple bars.

BRIEF DESCRIPTION OF THE INVENTION

Figure 1:
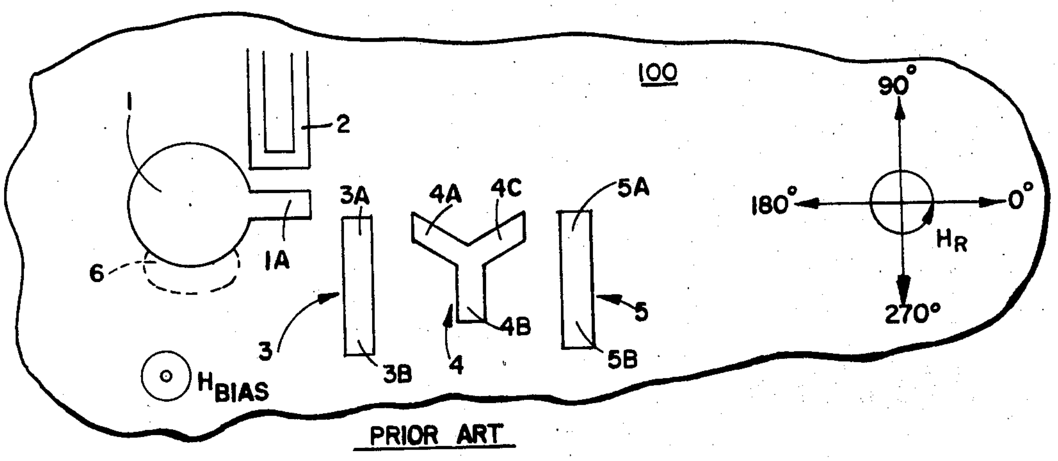
FIG. 1 is a schematic representation of a keyhole generator known in the prior art.

Referring now to FIG. 1, there is shown a bubble domain generator which is known in the prior art (e.g. U.S. Pat. No. 3,611,331-Bonyhord). This type of generator referred to as a "keyhole" or loop generator. The keyhole generator known in the art comprises areas of suitable magnetizable material, such as permalloy, disposed on a magnetic film 100. The magnetic film is of any suitable bubble domain type film known in the art. The keyhole generator comprises pad 1, including an extension 1A (or nose portion) which extends from one side thereof. A first bar-like magnetizable area 3 (I-bar) associated with the propagation path is disposed adjacent to pad 1. Bar 3 is spaced from and essentially orthogonal to the nose portion 1A of pad 1. A second I-bar area 5 of magnetizable material (which may be part of the propagation path) is located parallel to and spaced from bar 3. A Y-bar area 4 of magnetizable material is disposed between the parallel bars 3 and 5. Bias field $H_{BIAS}$ is applied to the device as suggested in FIG. 1 to provide a suitable field to establish magnetic bubble domains in film 100. In addition, rotational magnetic field $H_R$ is supplied to the field by a source (not shown) which is well known. A suitable conductor 2 connected to a current source or the like (not shown) is disposed adjacent to nose portion 1A or pad 1. The conductor is substantially a U-shaped fine-line (i.e. loop) conductor for supplying a cutoff signal to the generator.

In operation, a seed bubble domain 6 (shown in dashed outline) is created adjacent to the bottom portion of pad 100 when field $H_R$ is in the 270° position. As field $H_R$ rotates to the 0° position, the seed magnetic bubble domain rotates around and, essentially, conforms to the configuration of nose portion 1A of pad 1. That is, seed bubble domain 6 rotates to nose portion 1A and becomes somewhat extended in the direction of nose portion 1A in response to field $H_R$. As field $H_R$ continues to rotate toward the 90° position, a magnetic pole is established at region 3A of I-bar 3 wherein bubble domain 6 essentially stretches between the upper portion of pad 1 and region 3A of I-bar 3 due to magnetic poles generated at these regions by the field $H_R$. Thus, an elongated bubble domain area is established between I-bar 3 and pad 1. As field $H_R$ continues to rotate toward the 180° position, the magnetic bubble tends to stretch even further, i.e., between region 4A of Y-bar 4 and the left-most portion of pad 1. At a suitable moment during the rotation of the field $H_R$, a current signal is applied to conductor 2 by a source (not shown) to establish a magnetic field around conductor 2. The magnetic field created relative to conductor 2 is such that the elongated or stretched bubble domain is severed and separates into the original seed domain 6 and a new bubble domain which is established between regions 3A and 4A of bars 3 and 4, respectively. The duration of the current signal is only long enough to cause the separation of the stretched domain into two parts.

The field $H_R$ continues to rotate toward the 270° position to complete the generation cycle. Consequently, seed bubble domain 6 returns to the original position and the bubble generated in the propagation path essentially moves to region 4B of Y-bar 4. The operation of this generator continues as described and bubbles are generated in the system. Of course, if no bubble is to be generated at a particular time, a current pulse is not applied to conductor 2. Therefore, the magnetic domain "snaps-back" to reform with seed bubble domain 6 and a bubble domain is not produced in the propagation path.

The difficulties encountered with this type of system include the requirement that conductor 2 must be an extremely fine-line conductor with the attendant fabrication problems. Furthermore, the margin characteristics for the generator are usually narrower than the associated propagation path elements. These problems and shortcomings render the keyhole generator of the prior art difficult to fabricate for bubble sizes of the state of the art and difficult to operate as well as reducing the reliability thereof.

Figure 2:
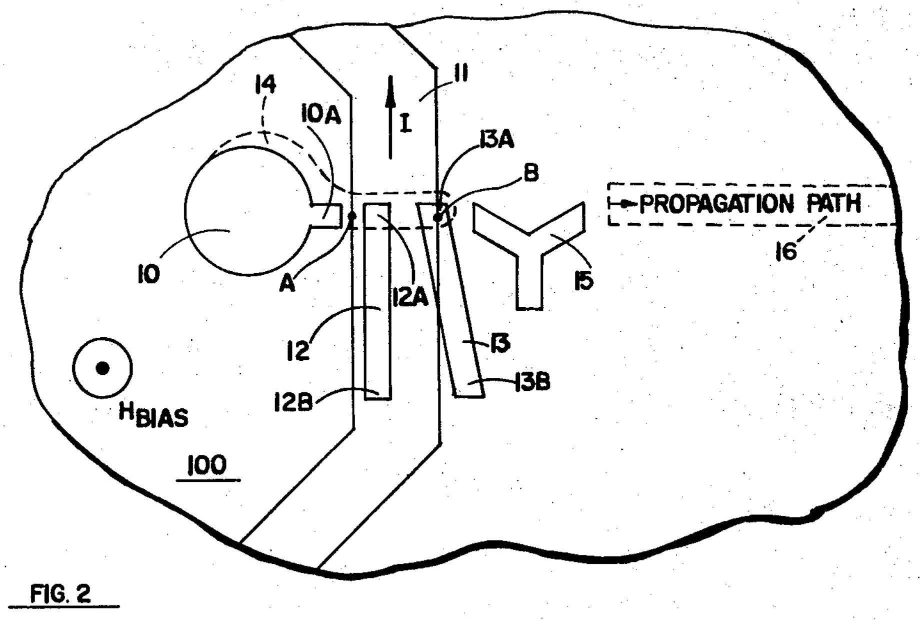
FIG. 2 is a diagramatic showing of one embodiment of the instant invention.

Referring now to FIG. 2, there is shown a diagrammatic representation of one embodiment of the instant invention. In the bubble domain generator configuration shown in FIG. 2, pad 10 is similar to pad 1 of the generator shown in FIG. 1. Likewise, I-bar 12 is somewhat similar to I-bar 3 shown in FIG. 1. However, I-bar 13 which is of substantially the same directional characteristics of bar 12 is arranged in a non-parallel relationship relative to bar 12. That is, the upper region 13A of I-bar 13 is disposed closer to the upper region 12A of I-bar 12 than lower region 13B is to lower region 12B of bar 12.

A typical Y-bar propagation element 15 is located adjacent to I-bar 13. Additional propagation structures of any suitable design are utilized to form the remainder of propagation path 16. Again, Y-bar 15 operates as an interface structure between the generator and propagation path 16.

Conductor 11 is shown disposed between the propagation path (including Y-bar 15) and pad 10. In particular, conductor 11 substantially overlies bar 12 and, in this embodiment, a portion of region 13A of bar 13. The particular arrangement of bar 13 (especially portion 13A thereof) and conductor 11 is not limited to the specific relationship shown.

In operation, seed magnetic bubble 14 moves around the periphery of pad 10, as suggested relative to the generator of FIG. 1, under the influence of rotational field $H_R$ (See FIG. 1). However, as suggested in FIG. 2, when field $H_R$ is in the 90° position, the magnetic bubble extends from the top portion of pad 10 to the magnetic poles established at region 12A of bar 12 and region 13A of bar 13. If a bubble is to be generated, a current pulse is supplied to conductor 11 by a suitable source (not shown). The magnetic field induced by the current in conductor 11 causes an increase in the potential energy barrier at point A. The increase in the energy barrier effectively blocks or severs the stretched bubble domain at point A. Also, the magnetic field produced by the current in conductor 11 increases the potential energy well at point B. The increased energy well condition essentially attracts the newly generated bubble (i.e., the bubble domain existing between magnetic poles 12A and 13A) to point B which is essentially the magnetic pole at region 13A of bar 13. The duration of the current pulse is such as to cause the severing of the seed domain and the contraction of the newly generated bubble domain as described above. Currently, the seed magnetic bubble 14 essentially contracts and continues to rotate around pad 10 under the influence of field $H_R$. Thereafter, the bubble domain at region 13A of bar 13 propagates along the propagation path, including Y-bar element 15, under the control of influence of field $H_R$.

Figure 3:
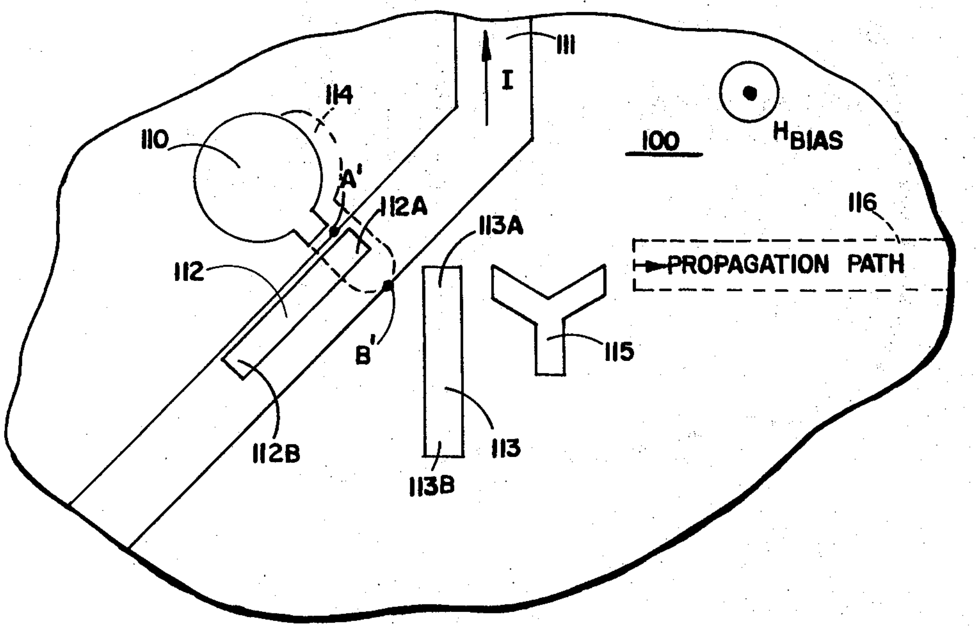
FIG. 3 is a diagramatic showing of another embodiment of the instant invention.

Referring now to FIG. 3, there is shown another embodiment of the instant invention. In this embodiment, elements which are similar to those elements shown in FIG. 2 bear similar reference numerals except in the 100 series. For example, pad 110 (FIG. 3) is similar in configuration, material and design to pad 10 in FIG. 2. Similarly, I-bar propagation element 112 is located adjacent to pad 110. Also, I-bar propagation element 113 is located adjacent to I-bar element 112. Again, I-bars 112 and 113 are arranged in a non-parallel relationship with the regions 112A and 113A relatively close to each other while the regions 112B and 113B are spaced further apart. A Y-bar propagation element 115 is used as an interface element between I-bar 113 and the additional propagation path 116 which may be fabricated of any suitable propagation elements.

Conductor 111 is disposed adjacent to the generator device and, in particular, overlies bar 112. Again, while the particular configuration shown is illustrative and not limitative, I-bar 113 is not located under conductor 111.

Furthermore, it is noted that I-bars 112 and 113 are spaced further apart than bars 12 and 13 in FIG. 2. Typically, the distance between bars 112 and 113 is approximately 4 to 5 times the distance between bars 12 and 13 of FIG. 2. The increase in the distance between bars 112 and 113 reduces the tendency of the seed bubble domain 114 to stretch out to propagation path 116 at the lower bias limit for the magnetic material utilized in the device thus reducing any tendency for the generator to lose the seed domain. Furthermore, the spacing between pad 110 and I-bar 113 is reduced to the minimum value which can be achieved by photolithographic fabrication techniques. When this space is minimized or reduced, the potential barrier between the pad and the I-bar is minimized and the seed bubble can stretch out from pad 110 to I-bar 112 at a bias field higher than the bias limit of the propagation circuit. Therefore, the margin characteristic for the multiple bar generator is made quite wide (in comparison to the propagation path elements) for each magnetic film material.

The circuit device shown in FIG. 3 operates substantially the same as the circuit devices shown in FIGS. 1 and 2. That is, the seed magnetic bubble 114 rotates around the periphery of pad 110 under the control and influence of field $H_R$. When the bubble stretches out from pad 110 toward a magnetic pole at region 113A of I-bar 113, a current pulse on conductor 111 will sever a new magnetic bubble. That is, as suggested supra, the magnetic field produced at conductor 111 by the current pulse therethrough causes an increased energy barrier at point A' and an increased energy well at point B'. Thus, the bubble is severed at point A' and attracted to point B' from whence the bubble is attracted to region 113A or I-bar 113.

As in the case of I-bars 12 and 13, I-bars 112 and 113 are disposed at an angle with respect to each other. Therefore, the magnetic poles at regions 13A and 113A of I-bars 13 and 113, respectively, are generated later in time than the poles at regions 12A and 112A of bars 12 and 112, respectively. Furthermore, the embodiment shown in FIG. 3 includes a greater angle between the respective I-bars 112 and 113. Therefore, the magnetic pole at region 113A of bar 113 is far more effective to attract the bubble which is generated at point B' subsequent to a current pulse in conductor 111.

Figure 4:
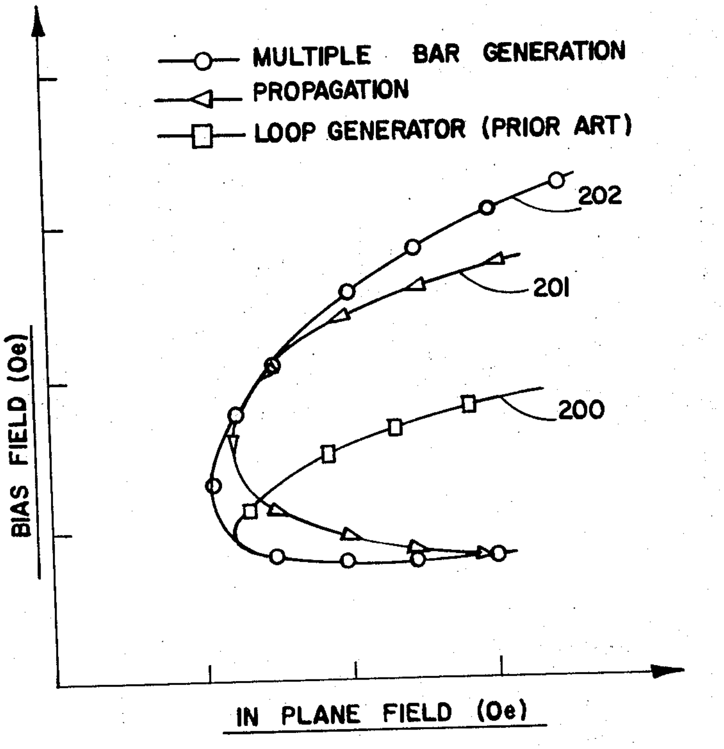
FIG. 4 is a graphic representation of operating characteristics of the subject invention.

Referring now to FIG. 4, there is shown a graphical representation of the quasi-static margin for the magnetic circuit operation. Variations in the type of magnetic film the geometry of the permalloy structure, the spacing of the propagation elements and the like will cause the particular curves for the respective parameters to vary.

Curve 201 (indicated by triangles) is representative of the propagation of bubble domains in an arbitrarily chosen Y-bar propagation structure. This curve is seen to be very closely matched to the operating margin for the multiple bar keyhole generator operation in generating bubbles as defined by curve 202.

Curve 200 (indicated by squares) depicts the operating margin for a loop-keyhole generator. It is readily observable that the operating margin (i.e., width of the open ended curve) for the multiple bar keyhole generator (viz. curve 202) is extremely large relative to the operating margin for the keyhole loop generator (viz. curve 200). This phenomenon, which is attributed to the specific configuration of the multiple bar generator, permits improved operating characteristics for magnetic bubble domain devices.

One advantage obtainable from the multiple bar generator noted and described above is that conductor 11 or 111 is much wider than the fine-line conductors previously used. This permits easier fabrication of the conductor, and, thus, the magnetic bubble domain device. Moreover, in this case the single conductor is located immediately adjacent to the propagation pad. This permits somewhat easier alignment procedures. In addition, the current pulse requirements are approximately halved with respect to prior devices. Furthermore, by providing the pair of vertical or I-bars, the bubble is forced to stretch between the bars rather than from the pad to the propagation path via an open region of the bubble material. This reduces the amount of stretch required for generation and results in better control of the seed domain. It is theorized that increase in the frequency capability for generation of bubbles should be improved.

While the following information is illustrative only and is intended to be suggestive of useful and typical dimensions for the embodiments shown in FIGS. 2 and 3, it is clearly not to be considered as limitative of the invention. In the embodiment shown, it is suggested that pads 10 and 110 may have a diameter equal to or approximately 6 times the radius (i.e., 6r) of the bubble to be generated. Conductor 11 or 111 has a width equal to approximately 3 times the radius (3*r*) of a magnetic bubble domain. I-bars 12, 13, 112 and 113 are each approximately 4/3 *r*. The spacing between the first I-bar (12 or 112) and the pad 10 (or 110) is approximately 2/3 *r* in FIG. 2 and approximately 1/2 *r* in FIG. 3 (where r represents the radius of a bubble). The spacing between the regions 12A and 13A of bars 12 and 13 is approximately 2/3 *r*. In the embodiment shown in FIG. 3, regions 112A and 113A of I-bars 112 and 113 are spaced apart by approximately 3 *r*. Similarly, the angle between bars 112 and 113 is approximately 45° while the angle between bars 12 and 13 is approximately 22°.

Thus, there has been described a multiple-bar keyhole generator for generating magnetic bubble domains in a suitable magnetic film. The description, and the drawings, are illustrative only and are not meant to be limitative of the invention. Modifications to the devices shown in FIGS. 2 and 3, which modifications fall within the purview of this invention, are intended to be covered by this description. For example, the nose portions 10A and 110A may be removed from pads 10 and 110 in some applications without deleterious effects on the operation of the device. Any such modifications which occur to those skilled in the art are intended to be included within this description.

Having thus described the preferred embodiments of the instant invention, what is claimed is:

1. A magnetic bubble domain generator on a magnetic film comprising a first area of magnetizable material for establishing a seed bubble domain, a first elongated area of magnetizable material disposed adjacent to said first area to receive a bubble domain from said first area, a second elongated area of magnetizable material disposed adjacent to said first elongated area of magnetizable material in a generally side-by-side relationship to receive a bubble domain from said first elongated area, magnetic field generating means for causing said seed bubble domain to extend from said first area of magnetizable material to said first and second elongated areas of magnetizable material, a conductor disposed adjacent to said first area of magnetizable material and over at least said first elongated area of magnetizable material, said conductor adapted to receive a current pulse which induces a magnetic field in said conductor which magnetic field severs the extended bubble domain between said first area of magnetizable material and said first elongated area of magnetizable material, and a propagation path on said magnetic film with one end thereof adjacent said second elongated area, one of said first and second elongated areas of magnetizable material arranged orthogonally relative to the direction of propagation through said propagation path.

2. The magnetic bubble domain generator recited in claim 1 wherein said first and second elongated areas of magnetizable material are spaced away from each other on said magnetic film and arranged in a non-parallel relationship.

3. The magnetic bubble domain generator recited in claim 1 wherein said first area of magnetizable material is substantially circular in configuration.

4. The magnetic bubble domain generator recited in claim 1 wherein said first and second elongated areas of magnetizable material are substantially I-shaped areas.

5. The magnetic bubble domain generator recited in claim 1 wherein all of said areas of magnetizable material are of permalloy.

6. The magnetic bubble domain generator recited in claim 1, wherein said conductor is wider than either of said first and second elongated areas of magnetizable material but narrower than said first area of magnetizable material.

7. The magnetic bubble domain generator recited in claim 1 wherein said conductor is disposed over only said first elongated area.

8. The magnetic bubble domain generator recited in claim 1 wherein said conductor is a single, elongated strip.

9. The magnetic bubble domain generator recited in claim 1 wherein said first area of magnetizable material includes an extended portion which extends in the direction toward said first elongated area of magnetizable material.

10. The magnetic bubble domain generator recited in claim 1 wherein said first and second elongated areas of magnetizable material are disposed at an angle of between about 22° and 45° with respect to each other.

* * * * *